Sept. 6, 1960     S. FOLZ     2,951,720

SAFETY COLLAR

Filed Dec. 11, 1957

INVENTOR.
SAMUEL FOLZ
BY
Woodhams, Blanchard & Flynn
ATTORNEYS

United States Patent Office 2,951,720
Patented Sept. 6, 1960

2,951,720
SAFETY COLLAR

Samuel Folz, Kalamazoo, Mich., assignor to The Brundage Company, Kalamazoo, Mich., a corporation of Michigan Filed Dec. 11, 1957, Ser. No. 702,178

1 Claim. (Cl. 287—52)

This invention relates to a thrust collar construction for use with a shaft and particularly to a type of construction which can be made from a single piece of material by simple and inexpensive metal working procedures.

While the subject matter of the present invention is applicable to a wide variety of specific uses, its development was occasioned by certain needs in the centrifugal blower industry and accordingly it will be described in terms thereof. However, it will be understood that these uses and requirements are merely illustrative of much broader applicablity for the thrust collar of the invention and hence the employment of such specific illustration will not be taken as limiting.

In the manufacture of many industrial products, referring now particularly for illustrative purposes to the manufacture of centrifugal blowers, it is often desirable to apply an inexpensive type of thrust collar onto a shaft to prevent axial motion of such shaft with respect to the blower bearings during shipment. The collar may, and often is, then removed and discarded. Accordingly, it is necessary that such collar be at the very least of sufficient strength to hold the shaft firmly in position for the time, and under the conditions, of shipment and that it be strong enough to hold such shaft in such manner even against the application of somewhat substantial axial shock forces thereto. On the other hand, since the manufacture and sale of centrifugal blowers, particularly of the furnace type, is a highly competitive business, it is necessary that the thrust collar used for this purpose be of extremely low cost.

In other instances, the thrust collar will not be discarded after installation of the blower but it remains a functioning part of the unit throughout the life of the blower. In such case, the strength requirements remain appreciable indefinitely and yet, because of the competitive condition of the blower business, the requirement for low cost remains unchanged. Further, in order to minimize inventory, assembly and other problems, it is desirable to use the same thrust collar for all cases, whether or not it is to be later discarded.

Accordingly, a principal object of the invention is to provide a thrust collar which can be manufactured extremely inexpensively but which will be strong and sturdy.

A further object of this invention is to provide a device, as aforesaid, wherein the thrust collar will be strong enough to hold a shaft against axial movement with respect to a bearing during shipment of the apparatus of which the shaft is a part.

A further object of this invention is to provide a device, as aforesaid, which can be manufactured by simple processes from a single piece of material.

A further object of this invention is to provide a device, as aforesaid, which can be made by automatic machinery on a high-production basis.

A further object of this invention is to provide a device, as aforesaid, which can be quickly fastened in place either by passing it over the end of a shaft or without passing it over the end of a shaft.

A further object of this invention is to provide a device, as aforesaid (which can be held firmly in its desired position with respect to a shaft by a single set screw.

Other objects and purposes of the invention will become apparent to persons acquainted with devices of this general type upon reading the following specification and inspection of the accompanying drawings.

Figure 1:
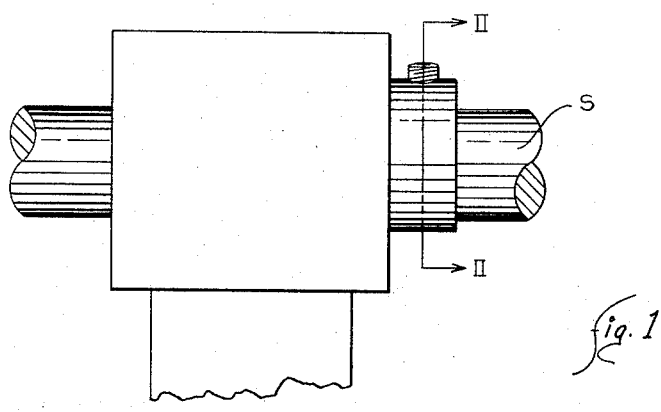
Figure 1 is a side view of the thrust collar of the invention shown installed in operating position on the shaft of a fragmentarily illustrated machine.
Figure 2:
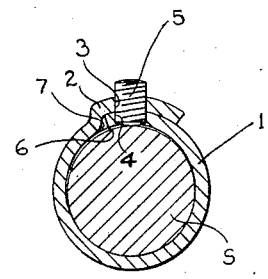
Figure 2 is a section taken along the line II—II of Figure 1.
Figure 3:
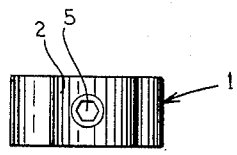
Figure 3 is a top view of the thrust collar.

In meeting the objects and purposes above set forth, I have provided a thrust collar formed from a single strip of material to provide a circular, or collar, portion 1 and a radially offset overlapping portion 2. An opening 3 is provided in the overlapping portion 2 and an opening 4 is provided in the collar portion 1, said openings 3 and 4 being threaded and being coaxial with each other when the thrust collar is in its operating position on or with respect to, a shaft S. A single set-screw 5 extends through the openings 3 and 4 and engages the shaft S in the usual manner. The end 6 of the collar portion 1 is shaped to fit snugly into the opposed angle 7 of the overlapping portion 2 and the action of the set-screw 5 normally holds said end 6 and the overlapping portion 2 tightly together.

By this device there is provided a structure which can be readily formed by stamping or other metal working procedures rapidly and efficiently, by high production methods and from a single sheet of material, the forming step being followed only by a hole-threading step if and where a self-tapping set-screw is not used. The set screw is the only part required to complete the assembly. Hence, the entire device consists of only two elements, which reduces the cost of construction and promotes the ease of assembly and installation. The use of both overlapping portions of the collar material for holding the set screw 5 and their snug engagement with each other provides a firm and ample support for said set-screw with respect both to the shaft 3 and to the collar portion 1. Further, the normal tendency of the collar material to spring back in an opening direction, which tendency can be accentuated if desired in the forming operation, will strongly inhibit loosening of the set-screw and hence such spring-back tendency will tend to hold the set-screw in a given position.

It will be recognized that the collar portion 1 may be applied to a shaft by applying it thereto over the end of the shaft or, by removal of the set-screw 5, the collar can be opened sufficiently that it can be applied to the shaft without going over the end of the shaft.

It will be recognized that the collar 1 can be made from any reasonably resilient and durable material, such as steel, but other materials, including plastics, are possible for adapting the structure to special uses.

While one particular embodiment of the invention has been shown and described for purposes of illustrating the invention, it will be recognized that modifications thereof will readily occur to those acquainted with the general type of device herein concerned and the hereinafter appended claim will be construed to include such modifications excepting as such claim expressly requires otherwise.

I claim:

In a structure of the character described, the combination comprising: an elongated cylindrical shaft; a one-piece strip arranged in an annular shape in which said shaft is disposed, said strip being of uniform, substantially rectangular cross section throughout its length and said strip including a first, axially split and cylindrical portion, said strip being bent to define a second, radially outwardly extending portion at one edge of the split, the other edge of the split being adjacent to said second portion, said strip being bent at the radially outward edge of said second portion to define a third, partially cylindrical portion overlapping and engaged with a section of said first portion adjacent said other edge, said second and third portions being the only parts fixed with respect to said first portion and located radially outwardly thereof, said third portion and said section having aligned, radially extending, threaded openings therethrough; and a set screw engageable with and threadedly receivable through said threaded openings, said screw being extendable radially inwardly of said section for firm engagement with the periphery of said shaft within said cylindrical portion, whereby said shaft is firmly gripped by and between the inner end of said set screw and the part of said cylindrical portion diametrically opposite said set screws.

References Cited in the file of this patent

UNITED STATES PATENTS

| | | |
|---|---|---|
| 41,630 | McBurney | Feb. 16, 1864 |
| 298,317 | Sherman | May 6, 1884 |
| 773,188 | Boast | Oct. 25, 1904 |
| 989,203 | Stebbins | Apr. 11, 1911 |
| 1,053,151 | Braddock | Feb. 18, 1913 |
| 1,255,417 | Hedges | Feb. 5, 1918 |
| 1,290,974 | Gragg | Jan. 14, 1919 |
| 1,473,715 | Wessel | Nov. 13, 1923 |
| 1,767,198 | Baker | June 24, 1930 |